United States Patent
Krüger et al.

(10) Patent No.: US 9,267,207 B2
(45) Date of Patent: Feb. 23, 2016

(54) CENTRAL TUBE FOR A LINEAR CONCENTRATING SOLAR THERMAL POWER PLANT, HAVING AN ABSORBER LAYER, AND METHOD FOR APPLYING SAID ABSORBER LAYER

(75) Inventors: Ursus Krüger, Berlin (DE); Daniel Reznik, Berlin (DE); Oliver Stier, Berlin (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 898 days.

(21) Appl. No.: 13/499,384

(22) PCT Filed: Sep. 14, 2010

(86) PCT No.: PCT/EP2010/063441
§ 371 (c)(1),
(2), (4) Date: Mar. 30, 2012

(87) PCT Pub. No.: WO2011/039051
PCT Pub. Date: Apr. 7, 2011

(65) Prior Publication Data
US 2012/0180783 A1    Jul. 19, 2012

(30) Foreign Application Priority Data

Sep. 30, 2009  (DE) .......................... 10 2009 048 672

(51) Int. Cl.
*F24J 2/48* (2006.01)
*C23C 24/04* (2006.01)
(Continued)

(52) U.S. Cl.
CPC . *C23C 24/04* (2013.01); *F24J 2/07* (2013.01); *F24J 2/4612* (2013.01); *F24J 2/487* (2013.01); *Y02E 10/41* (2013.01)

(58) Field of Classification Search
CPC .............. F24J 2/481; F24J 2/487; F24J 2/04; F24J 2/07; F24J 2/4612; C23C 24/04; Y02E 10/28
USPC ......................................... 126/651, 676, 677
See application file for complete search history.

(56) References Cited

U.S. PATENT DOCUMENTS

| 4,005,698 A | 2/1977 | Cuomo et al. |
| 4,317,444 A | 3/1982 | Maruko |

(Continued)

FOREIGN PATENT DOCUMENTS

| CN | 1964079 | 5/2007 |
| CN | 101178260 | 5/2008 |

(Continued)

OTHER PUBLICATIONS

European Office Action for corresponding European Application 10 754 482.7-1362; dated Jul. 2, 2013.

(Continued)

*Primary Examiner* — Kenneth Rinehart
*Assistant Examiner* — Gajanan M Prabhu
(74) *Attorney, Agent, or Firm* — Staas & Halsey LLP

(57) ABSTRACT

A central tube for linear concentrating solar thermal power plants, has an absorber layer. The absorber layer is generated by cold gas sputtering, wherein suitable method parameters can in particular generate an increased surface roughness by means of pores in the surface region of the absorber layer. An absorber layer can thus be advantageously produced, having a quadratic roughness of no more than 1 μm, measured in a close range of no more than 50 μm diameter, and preferably being made of a corrosion-proof hard alloy comprising tungsten carbide, in particular WC—CoCr, WC—Co, WC—FeCo, WC—FeC, WC—FeNi, WC—Ni or WC—NiCr.

14 Claims, 1 Drawing Sheet

(51) Int. Cl.
*F24J 2/07* (2006.01)
*F24J 2/46* (2006.01)

(56) References Cited

U.S. PATENT DOCUMENTS

| | | | |
|---|---|---|---|
| 4,339,484 A | 7/1982 | Harding | |
| 5,979,439 A | 11/1999 | Hoffschmidt et al. | |
| 8,893,711 B2 * | 11/2014 | Kennedy | 126/652 |
| 2003/0027000 A1 * | 2/2003 | Greenberg et al. | 428/432 |
| 2007/0107775 A1 | 5/2007 | Choi et al. | |
| 2007/0209658 A1 * | 9/2007 | Riffelmann et al. | 126/684 |
| 2009/0208761 A1 | 8/2009 | Silmy et al. | |
| 2010/0038145 A1 * | 2/2010 | Lockstedt et al. | 175/374 |
| 2010/0119707 A1 * | 5/2010 | Raybould et al. | 427/185 |
| 2010/0326512 A1 | 12/2010 | Berek et al. | |
| 2011/0203573 A1 * | 8/2011 | Hollis et al. | 126/595 |

FOREIGN PATENT DOCUMENTS

| | | |
|---|---|---|
| DE | 27 25 914 | 12/1977 |
| DE | 2725914 | 2/1987 |
| DE | 19743428 | 4/1999 |
| DE | 19933050 | 4/2000 |
| DE | 102004038233 | 3/2006 |
| DE | 102007053959 | 7/2009 |
| DE | 102008003616 | 7/2009 |
| DE | 102008010199 | 8/2009 |
| DE | 10 2009 048 672.0 | 9/2009 |
| EP | 0015487 | 9/1980 |
| EP | 1 786 047 A1 | 5/2007 |
| GB | 2436360 | 9/2007 |
| JP | 57-155396 | 9/1982 |
| WO | 2009/056235 | 5/2009 |
| WO | PCT/EP2010/063441 | 9/2010 |

OTHER PUBLICATIONS

Chinese Office Action issued Jul. 22, 2013 in corresponding Chinese Application No. 201080043933.9.

Guan Leding et al., Research Development of Preparing Coatings by Cold Gas Dynamic Spraying, Material Review, vol. 22, No. 5, pp. 100-103, 2008.

Ambrosini, Andrea et al.: "Improved High Temperature Solar Absorbers for Use in Concentrating Solar Power Central Receiver Applications"; Proceedings of the ASME 2011 5th International Conference on Energy Sustainability, ES2011, Aug. 7-10, 2011, Washington, DC, USA; 2011; US.

Chinese Office Action for corresponding Chinese Application No. 201080043933.9; issued Feb. 19, 2014.

Europäische Norm DIN EN 657 Thermisches Spritzen—Begriffe, Einteilung; Deutsche Fassung EN 657:2005, Thermal spraying—Terminology, classification; German version EN 657:2005, 23 pages.

G. L. Harding et al., "Magnetron-sputtered metal carbide solar selective absorbing surfaces," Journal of Vacuum Science and Technology, vol. 16, No. 3, May/Jun. 1979, pp. 857-862.

International Search Report for PCT/EP2010/063441, mailed on Dec. 21, 2010.

German Office Action for German Priority Patent Application No. 10 2009 048 672.0, issued on Nov. 18, 2010.

* cited by examiner

CENTRAL TUBE FOR A LINEAR CONCENTRATING SOLAR THERMAL POWER PLANT, HAVING AN ABSORBER LAYER, AND METHOD FOR APPLYING SAID ABSORBER LAYER

CROSS REFERENCE TO RELATED APPLICATIONS

This application is based on and hereby claims priority to International Application No. PCT/EP2010/063441 filed on Sep. 14, 2010 and German Application No. 10 2009 048 672.0 filed on Sep. 30, 2009, the contents of which are hereby incorporated by reference.

BACKGROUND

The invention relates to a method for applying an absorber layer onto a central tube. The invention furthermore relates to a central tube for a linear concentrating solar thermal power.

Linear concentrating solar thermal power plants are generally known. They can be configured as a parabolic trough power plant. The latter have parabolic trough collectors, which have a parabolic cross section which is upwardly open such that sunlight can be incident. The rays of the sun are reflected by the inner surface of the trough and impinge on a central tube, in which a heat-storing fluid circulates (for example an oil or molten salt). The heat transfer medium in the central tube transfers the heat for example to a thermal power generation system. Fresnel collectors can alternatively be used, in which the sunlight is collected using a Fresnel lens rather than with a parabolic mirror. The concentrating solar thermal power plants will also be referred to below as solar power plants for short. It should furthermore be noted that the term power plant should be understood in the widest sense. It is not only possible to equip heat engines such as turbines with the abovementioned collectors, but the heat stored in the heat-storing medium can also be used directly.

In order to achieve as high an efficiency of the solar power plant as possible, as much of the solar energy as possible must be injected into the heat transfer medium. To this end, the central tube is provided with a spectrally selective absorber layer which has as high a solar absorptivity $\alpha$ as possible and as low a thermal emissivity $\epsilon$ as possible. In order to efficiently convert solar light energy into thermal energy, the absorber layers should generally have a high solar absorptivity $\alpha$ and a small thermal emissivity at the respective operating temperature. Spectrally selective absorber layers are therefore characterized by low reflectivity ($\rho \approx 0$) for wavelengths $\lambda$ under 2 μm and high reflectivity ($\rho \approx 1$) for wavelengths $\lambda$ over 2 μm. Therefore there is a need for spectrally selective absorber layers for linear concentrating solar thermal power plants, which are easy and cost-effective to produce and are chemically and thermally stable at temperatures of around or over 500° C. in air. An ideal absorber layer would have a solar absorptivity $\alpha \geq 0.98$ and a thermal emissivity $\epsilon \leq 0.05$ at at least 500° C. For operation at what is referred to as medium temperature, a solar absorptivity $\alpha > 0.85$ and a thermal emissivity $\epsilon < 0.15$ at 400° C. are aimed for in the technically customary realization of absorber layers. The stability of the absorber layer in air under such operating conditions is another objective because it renders vacuum encapsulation of the central tubes in parabolic trough collectors, which is still prevalent today, requires great outlay in terms of construction and is expensive, obsolete.

It may therefore also be sensible to tolerate lower solar absorptivities $\alpha$ and/or higher thermal emissivities $\epsilon$ than those mentioned above if, in return, the air stability under the desired operating conditions can be attained in an economically favorable manner. Such coatings, which are cheap to produce, are known from commercial parabolic trough systems for operating temperatures of up to 300° C. (SOLERA sunpower), which are mainly designed to generate process heat and not to generate power. However, they are not suitable for operating temperatures that are much higher, for example 400° C.

According to U.S. Pat. No. 4,005,698 it is known to generally provide surfaces as broadband converters for light energy, which have a dendrite-type surface structure. It is important here that the dendrites in terms of their height and their spacing are in the region of the wavelength or of a low-number multiple of this wavelength in order to ensure optimum absorption of the light at the relevant wavelength. The dendritic layers can be applied according to U.S. Pat. No. 4,005,698 by vapor deposition.

SUMMARY

It is one possible object to specify a central tube with absorber layer and a method for coating this central tube with an absorber layer, with which it is possible to achieve an appropriate efficiency of the solar power plant, wherein the absorber layer, however, is intended to be relatively cheap to produce or enable low production costs of the overall construction, for example because the absorber layer is stable in air.

The inventors propose a method that involves applying the absorber layer by cold gas spraying. Advantageously, cold gas spraying is a method with which it is possible to attain the relatively high application rates or layer thicknesses which are typical for thermal spraying methods. For this reason, this method is advantageously highly economical in its application. In addition, cold gas spraying can be used to attain the thermal conductivities of the layers produced that are typical for layers which are deposited electrochemically, by vapor deposition or by sputtering and that contribute to the functional suitability of the absorber layer. However, customary electrochemical or vapor deposition methods or sputtering advantageously need not be used because only very low layer thicknesses can be produced directly in this case and therefore the coating operation would have to be repeated several times, as a result of which the coating method would become considerably more expensive. It is furthermore advantageous for the absorber layer to be erosion-resistant with respect to dust, in particular sand, since solar power stations are preferably erected in areas with dry ground.

Preferably, a cold gas spraying system is used for cold gas spraying, which is also referred to as kinetic spraying, which cold gas spraying system has a gas heating device for heating a gas. Connected to the gas heating device is a stagnation chamber, which on its output side is connected to a convergent-divergent nozzle, preferably a de Laval nozzle. Convergent-divergent nozzles have a tapering partial section and widening partial section which are connected by way of a nozzle neck. The convergent-divergent nozzle produces, on the output side, a powder stream in the form of a gas stream with particles contained therein at high velocity, such that the kinetic energy of the particles is sufficient for said particles to adhere to the surface to be coated.

According to one advantageous embodiment, provision is also made for a multi-ply layer (also referred to by the common term multilayer coat) or a gradient layer or a plurality of plies of gradient layers to be deposited, i.e. a multi-ply layer, the plies of which are in each case configured like gradient layers. Here, the method parameters can be advantageously varied during the coating using cold gas spraying, so that the coatings can be advantageously matched in an optimum fashion to the requirement profile of absorber layers.

According to one further embodiment, provision is made for the material and/or the structural design of the absorber layer to vary in the circumferential direction of the central tube, so that the spectral absorption/emission characteristic of the absorber layer after installation of the absorber tube for example in a parabolic mirror on that side of the central tube that faces the sky (referred to as upper side below) is different than on that side that faces the apex of the reflector formed by the parabolic mirror (referred to as lower side below). As a result it is advantageously possible to match the effect of the absorber layer to the non-uniform temperature distribution at the circumference of the central tube, which temperature distribution results from the non-uniform irradiation intensity. The lower side of the central tube is, owing to the use of the reflectors, exposed to more strongly concentrated sunlight than the upper side and thus becomes hotter than the latter. Since the central tube is preferably made from steel (in particular stainless steel), the non-uniform heating can be compensated for only partially by heat conductance inside the tube wall along the circumference. The coating operation using cold gas spraying is carried out locally, as an inherent aspect thereof, only ever at the impingement location of the cold gas jet. This advantageously makes it possible to set the abovementioned variation in the absorber layer between upper side and lower side of the central tube simply by changing the coating parameters and/or exchanging the spray powder, as compared to electrochemically or vapor-deposited layers according to the related art. It is particularly advantageous for large-scale manufacturing to use a plurality of cold gas spraying nozzles at the same time and to produce the desired zones at the circumference of the central tube with each cold gas spraying nozzle using different process parameters and/or coating powders.

The variation in the layer properties described above between an upper and a lower side is only exemplary. In other reflector types or designs, it is possible for other forms of irradiation intensity and/or temperature that is/are non-uniform along the circumference to occur, to which, owing to the proposed method, the spectral absorption/emission characteristic of the absorber layer can be matched particularly simply.

According to one further embodiment, provision is made for the material and/or the structural design of the absorber layer to vary (also) in the longitudinal direction of the central tube. This is because, in some customary designs of linear concentrating solar power station, said central tube is flowed through by a liquid which is thus heated. In the direction of flow, the temperature of this liquid therefore continuously increases so that it is warmer when stationary in the tube section which is flowed through last than in the tube section which is flowed through first. Depending on the wall thickness of the central tube, the liquid temperature influences the temperature of the absorber layer, even if the irradiation intensity in the longitudinal direction of the tube is uniform. Then, the absorber layer is also warmer when stationary in the tube section which is flowed through last than in the tube section which is flowed through first. With increasing temperature of the absorber layer, the heat output emitted unused increases in accordance with the Stefan-Boltzmann law.

The coating formed by way of cold gas spraying here advantageously makes it possible to vary the spectral absorption/emission characteristic of the absorber layer in the longitudinal direction of the tube by a simple process such that in the cooler tube section, which is flowed through first, the absorptivity can be increased at the expense of the emissivity, while in the hot section, flowed through last, the emissivity can be lowered at the expense of the absorptivity.

According to a further embodiment, provision is made for the coating to be made of tungsten, molybdenum, nickel, nickel-tin, bronze, copper, brass, zinc, iron, steel, cobalt, chromium, aluminum, silver or mixtures of these metals. According to a further embodiment, a coating which is configured as described above additionally contains one or more of the following substances: aluminum nitride; lead sulfide; silicon; germanium; one oxide or a plurality of oxides of tungsten, molybdenum, nickel, copper, zinc, iron, cobalt, chromium, aluminum, manganese or silicon; one carbide or a plurality of carbides or one silicide or a plurality of silicides of tungsten, molybdenum, tantalum, iron, chromium or titanium. The coatings can be produced with roughnesses of 0.5 to 6 µm. This roughness does not preclude the surface of the absorber layer from simultaneously having a coarser topology of the surface which is overlaid onto the roughness (for example cold spraying paths, which result from guiding the cold gas jet over the surface to be coated).

Roughness within the context of this document is to be understood to mean a measure describing the respective spacing between the upper apices of the elevations under consideration which produce the roughness. This refers to elevations with in each case similar geometric dimensions, wherein it is also possible for elevations of different orders, i.e. with dimensions which are not geometrically similar, to superpose one another in the surface profile. By way of example, larger elevations with respective spacings of 6 µm with respect to one another and smaller elevations with spacings of 0.5 µm with respect to one another can also be provided.

If elevations of different orders are present, the roughness can be measured as explained below. Height values for the surface are measured distributed in an area of for example 50 µm in diameter. On the basis of these values it is also possible to ascertain the root-mean-squared roughness. The root-mean-squared roughness (RMS roughness) is calculated from the mean of the squared deviations and corresponds to the mean squared deviation of the height values.

If elevations of different orders are present, the roughness can alternatively be measured as explained below. The elevations and depressions of the absorber layer surface S are randomly distributed as follows: suppose F is an area excerpt of S, which is defined as a square with an edge length of 50×50 µm. The size is chosen such that periods of longer than 141 µm (twice the diagonal of the square) cannot be captured by the measurement. Waviness owing to the individual cold gas spraying paths, which is only avoided with difficulty or cannot be avoided altogether owing to the coating method selected, is therefore invisible, as it were. However, 50 µm is sufficiently large to still be able to see low multiples of the near-infrared wavelengths.

Suppose A is a toroidal compensation area, which represents the average spatial area profile of S within F. This compensation area is composed of an excerpt of a circular ring, which can be matched well to F, wherein in this case for example the curvature of the central tube can be taken into account. The projection F' of F onto A is simply connected, square, rectangular and equilateral (a non-planar square, as it were) with an edge length of 50 µm. The height (or depth) H of S at a point P of F is the directed spatial spacing of P to A. H is then a function fluctuating around zero over F' and is periodically continued outside of F'. The two-dimensional Fourier spectrum of H then has amplitudes which are greater than the maximum amplitude of the spatial frequencies which correspond to periods of less than 6 μm for none of the spatial frequencies which correspond to periods of greater than 6 μm. This can be measured for each excerpt F of S.

The measured result explained here can also be described as follows. Spacings of greater than 6 μm between elevations are statistically so rare that they play no role. As a result, the majority of the structures are laterally at most as large as those near-infrared wavelengths which constitute the largest portion of the intensity of black-body radiation at temperatures of 500° C.

Cold-gas sprayed surfaces with this roughness can reflect diffusely and absorb well in the solar wavelength range, but reflect specularly in the near-infrared, that is to say they behave like smooth surfaces with respect to the heat emission at operating temperatures of up to 500° C. This means that their roughness advantageously entails no increase of the effective emission area and thus no increase in the power emitted unused. This roughness can be produced by way of cold gas spraying with particularly suitable spray powder.

Suitable are spray powders which primarily contain particles of about the size of the desired roughness, wherein their deformation upon striking the surface must be taken into account. For this reason, they should be smaller than 10 μm over their mean diameter. Alternatively or in addition, the spray powder can contain significant mass proportions of particles which are not spherical but have irregular shapes with corners and edges. Particles of this type may also be larger than 10 μm, since their corners and edges produce the roughness of the layer surface after spraying. While spherical particles are often produced by way of gas atomization, suitable irregular particles can be produced on a commercial scale for example by way of water atomization, sintering and comminution or by way of electrolytic precipitation. The irregular shape of these particles cannot only make it easier to set the desired roughness of the absorber layer surface but also in principle favors the cold gas spraying process itself because such particles are accelerated more strongly in the spraying nozzle for cold gas spraying than spherical particles of the same mass. This is of particular relevance here, because many of the powder materials used have a high to very high specific weight, primarily tungsten and tungsten carbide. As a result of their higher velocities, irregular particles give a firmer layer structure than spherical particles of identical weight.

If the optimum roughness of 0.5 to 6 μm cannot be finally produced by the deposition process, it can also be improved by way of a surface aftertreatment, for example sand blasting or chemical etching.

Preferred among the coatings mentioned above are furthermore absorber layers made of tungsten or of corrosion-resistant tungsten-carbide-based cemented carbide, such as WC—CoCr, WC—Co, WC—FeCo, WC—FeC, WC—FeNi, WC—Ni or WC—NiCr. These are not only stable in air for a long time at temperatures of over 500° C. but also extraordinarily erosion-resistant and can be produced easily by cold gas spraying with commercially available, fine and irregularly shaped powder.

The layers with oxidic constituents can in this case be deposited using cold gas spraying by mixing metal powders with oxide powders, wherein the powder mixture is supplied to the cold gas spraying nozzle. Another possibility is the use of a reactive cold gas spraying method, in which oxidation of the powder particles occurs at least on the surfaces by admixing a reactive gas to the cold gas jet. Such a reaction can be supported additionally by activation for example using microwave radiation or using a laser. It is additionally also possible to first deposit metallic layers using cold gas spraying and to oxidize them in a separate step.

According to another embodiment, provision is made for the method parameters when producing that region of the absorber layer which is near to the substrate to be selected such that an at least substantially pore-free layer construction results. It is advantageously possible in this way to advantageously improve the thermal conductivity of the layer produced except for the immediate surface region. This is because it is possible with the cold gas spraying to produce nearly pore-free layers, wherein the method parameters which lead to the production of pore-free layers advantageously also effect particularly strong adherence of the layer produced to the substrate. This adherence is expedient on account of the large number of thermocycles (between day and night) simultaneously with a large temperature difference which is characteristic of linear concentrating solar thermal power plants. Cold gas spraying also has the advantage that the layers produced contain hardly any mechanical residual stresses which would stress the layer in addition to the temperature cycles.

The object stated above is furthermore achieved by a central tube for a linear concentrating solar thermal power plant having an absorber layer, which is composed of corrosion-resistant tungsten-carbide-based cemented carbide, in particular WC—CoCr, WC—Co, WC—FeCo, WC—FeC, WC—FeNi, WC—Ni or WC—NiCr.

It is also advantageous if this absorber layer has a roughness of 0.5 to 6 μm or if its surface profile can be described by a two-dimensional Fourier spectrum of the location-dependent height position H of the surface, which has amplitudes which are greater than the maximum amplitude of the spatial frequencies which correspond to periods of less than 6 μm for none of the spatial frequencies which correspond to periods of greater than 6 μm and less than at most 50 μm. This surface roughness can be produced advantageously with the cold gas spraying stated above and results in optimization of the emission behavior of the absorber layer.

According to one embodiment of the central tube, provision is made for the central tube to have a solar absorptivity $\alpha > 0.85$ and a thermal emissivity $\epsilon < 0.15$. This is achievable by way of the surface roughness of the absorber layer produced and by the material selection already mentioned.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
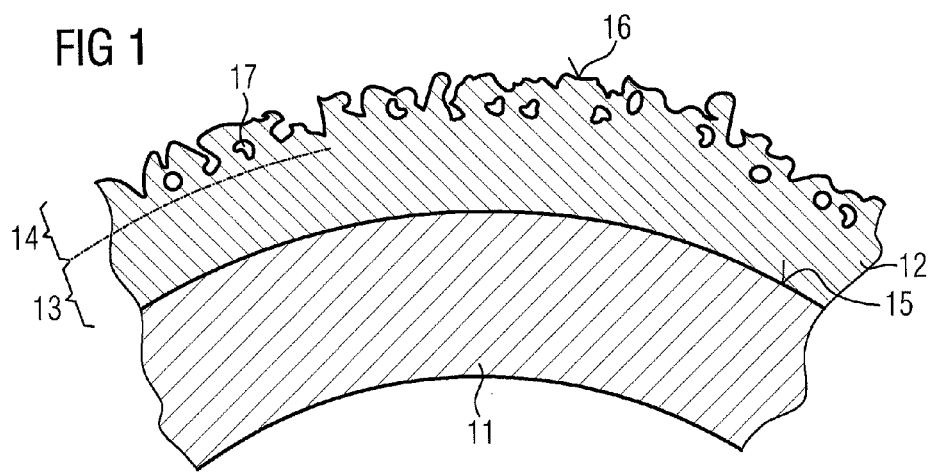
FIG. 1 shows a section through a partial section of the proposed absorber tube as an exemplary embodiment, produced by cold gas spraying.

Reference will now be made in detail to the preferred embodiments of the present invention, examples of which are illustrated in the accompanying drawings, wherein like reference numerals refer to like elements throughout.

According to FIG. 1, a central tube 11 for a parabolic trough power plant is composed for example of steel. Applied on the central tube is an absorber layer 12, which is configured as a multi-ply layer. The absorber layer has a ply 13, which was produced using different method parameters than the ply 14. The ply 13 is located on the surface 15 of the absorber tube 11 and has a pore-free structure with good adherence to the surface 15. The ply 14 is that part of this layer which forms the surface 16 of the absorber layer 12. Using different method parameters during cold gas spraying produces a slightly looser layer construction with pores 17, wherein the sprayed particles are deformed less owing to a lower introduction of energy. In particular, their surface structure remains almost completely intact, which produces a low emissivity in the near-infrared.

Figure 2:
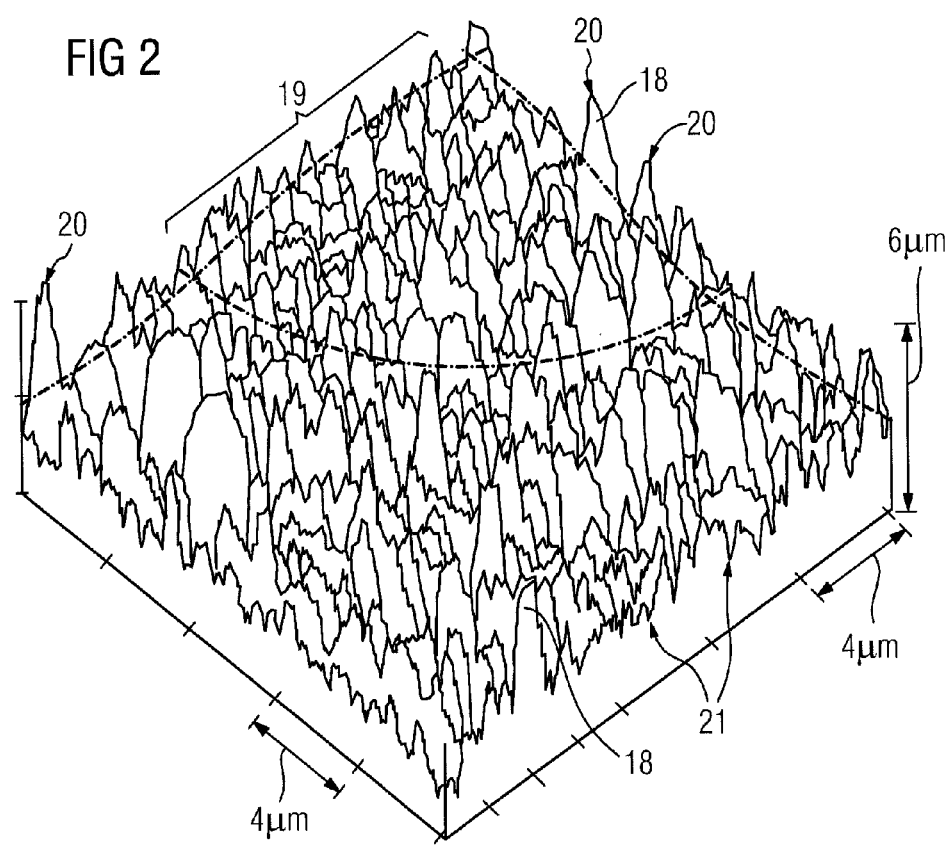
FIG. 2 shows a greatly enlarged, idealized surface excerpt of an exemplary embodiment of the absorber surface in a three-dimensional view.

FIG. 2 shows an excerpt of the surface thus produced. In order to give an idea of the dimensions of elevations 18, produced by the surface structure of the sprayed particles, FIG. 2 shows units of length in μm. It also shows that, in addition to the roughness formed by the elevations 18, a roughness of a larger scale is produced owing to the impingement of individual particles. This is indicated by dots and dashes, wherein the rear-most corner, in perspective view, of the excerpt illustrated forms the center point of a hill 19, as it were, which was formed by an individual, very large impinging particle. The roughness in the dimensions of the particles is also indicated in FIG. 1.

In FIG. 2 it also becomes clear that the elevations 18 have in each case apices 20, wherein the roughness is understood to mean that these apices 20 have spacings with respect to adjacent apices 20 of between 0.5 and 6 μm. At the same time it becomes clear that the level of the apices 20 and the level of the lowest points 21 of the depressions are likewise of an order of magnitude of 1 to 4 μm.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d 1865 (Fed. Cir. 2004).

The invention claimed is:

1. A method comprising:
   providing a solar-thermal-power-plant-linear-concentrating central tube; and
   depositing a corrosion-resistant tungsten-carbide-based cemented carbide by cold gas spraying to thereby apply an absorber layer onto the central tube,
   the absorber layer applied to have a surface with a roughness, a surface profile of which can be described by a two-dimensional Fourier spectrum of a location-dependent height position H of the surface, and
   the two-dimensional Fourier spectrum defined such that within spatial frequencies which correspond to spatial periods of greater than 6 μm and less than 50 μm, the amplitudes are not greater than a maximum amplitude within spatial frequencies which correspond to spatial periods of less than 6 μm.

2. The method as claimed in claim 1, wherein the cemented carbide is selected from the group consisting of WC—CoCr, WC—Co, WC—FeCo, WC—FeC, WC—FeNi, WC—Ni and WC—NiCr.

3. The method as claimed in claim 1, wherein the absorber layer is produced to have a surface with a root-mean-squared roughness of at most 1 μm, measured in a near range of at most 50 μm in diameter.

4. The method as claimed in claim 1, wherein the absorber layer is applied as a gradient layer, which has properties that change across a surface thereof.

5. The method as claimed in claim 1, wherein the absorber layer is layered on to form a multi-ply layer.

6. The method as claimed in claim 1, wherein
   the absorber layer is layered on to form a multi-ply layer having a plurality of plies, and
   at least one ply of the multi-ply layer is a gradient ply having properties that change across a surface thereof.

7. The method as claimed in claim 1, wherein
   the central tube serves as a substrate for the absorber layer,
   the absorber layer has a base region near the substrate and a surface region, and
   the base region is formed by controlling method parameters such that a substantially pore-free layer construction results.

8. The method as claimed in claim 1, wherein
   the cemented carbide is deposited by coating particles, and
   the method further comprises varying method parameters and/or a particle concentration in a circumferential direction and/or in a longitudinal direction of the central tube such that the properties of the absorber layer change across a surface thereof.

9. A device to linearly concentrate solar thermal energy, comprising:
   a central tube; and
   an absorber layer formed on the central tube, the absorber layer being formed of a corrosion-resistant tungsten-carbide-based cemented carbide and having a roughness of 0.5 to 6 μm,
   the absorber layer having a surface with a roughness, a surface profile of which can be described by a two-dimensional Fourier spectrum of a location-dependent height position H of the surface, and
   the two-dimensional Fourier spectrum defined such that within spatial frequencies which correspond to spatial periods of greater than 6 μm and less than 50 μm, the amplitudes are not greater than a maximum amplitude within spatial frequencies which correspond to spatial periods of less than 6 μm.

10. The device as claimed in claim 9, wherein the absorber layer is formed of at least one material selected from the group consisting of WC—CoCr, WC—Co, WC—FeCo, WC—FeC, WC—FeNi, WC—Ni and WC—NiCr.

11. The device as claimed in claim 9, wherein the absorber layer has a surface with a root-mean-squared roughness of at most 1 μm, measured in a near range of at most 50 μm in diameter.

12. The device as claimed in claim 9, wherein the device has a solar absorptivity α>0.85 and a thermal emissivity ε<0.15 at temperatures of at least 400° C.

13. The device as claimed in claim 9, wherein the absorber layer is formed from a material and/or with a structural design that changes in a circumferential direction and/or in a longitudinal direction of the central tube.

14. The device as claimed in claim 13, wherein the absorber layer has different absorption and emission characteristics across a circumferential direction and/or across a longitudinal direction of the central tube.

* * * * *